United States Patent
Heo et al.

(10) Patent No.: US 10,018,791 B2
(45) Date of Patent: Jul. 10, 2018

(54) MULTI-CHANNEL OPTICAL SUBASSEMBLY AND METHOD OF MANUFACTURING THE SAME

(71) Applicant: ELECTRONICS AND TELECOMMUNICATIONS RESEARCH INSTITUTE, Daejeon (KR)

(72) Inventors: Young Soon Heo, Gwangju (KR); Hyun Seo Kang, Gwangju (KR); Keo Sik Kim, Gwangju (KR); Sung Chang Kim, Gwangju (KR); Young Sun Kim, Gwangju (KR); Jeong Eun Kim, Gwangju (KR); Hee Seung Kim, Gwangju (KR); Ji Hyoung Ryu, Jeonju (KR); Hyoung Jun Park, Gwangju (KR); Dong Hoon Son, Gwangju (KR); Chan Il Yeo, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/709,247

(22) Filed: Sep. 19, 2017

(65) Prior Publication Data
US 2018/0081131 A1 Mar. 22, 2018

(30) Foreign Application Priority Data
Sep. 19, 2016 (KR) .......................... 10-2016-0119484

(51) Int. Cl.
G02B 6/32 (2006.01)
G02B 6/42 (2006.01)

(52) U.S. Cl.
CPC ............ *G02B 6/423* (2013.01); *G02B 6/425* (2013.01); *G02B 6/428* (2013.01); *G02B 6/4244* (2013.01)

(58) Field of Classification Search
CPC ...... G02B 6/423; G02B 6/428; G02B 6/4244; G02B 6/425
See application file for complete search history.

(56) References Cited

U.S. PATENT DOCUMENTS 9,297,969 B2 3/2016 Wu et al.
9,423,581 B2 * 8/2016 Feng ................... G02B 6/4286
(Continued)

FOREIGN PATENT DOCUMENTS

JP 2000-199838 A 7/2000
JP 2012-23218 A 2/2012
(Continued)

*Primary Examiner* — Ellen Kim

(57) ABSTRACT

Provided is a multi-channel optical subassembly. The multi-channel optical subassembly includes a first sub-mount including first and second areas having different thicknesses, a photoelectric device provided in the first area, a circuit board provided in the second area, a second sub-mount inserted into and fastened to the first guide hole and coupled to the first sub-mount, an optical fiber array fixed to the second sub-mount to provide a path through which light emitted from the photoelectric device is received or transferred, and a micro-lens array mounted on the second sub-mount. The first guide hole is provided in one of the first and second areas. The micro-lens array includes a lens collecting the light between the photoelectric device and the optical fiber array.

10 Claims, 11 Drawing Sheets

(56) References Cited

U.S. PATENT DOCUMENTS

| | | | |
|---|---|---|---|
| 9,680,573 B2 * | 6/2017 | Lin | H04B 10/2504 |
| 9,709,758 B2 * | 7/2017 | Dorrestein | G02B 6/423 |
| 2013/0077978 A1 | 3/2013 | Duis et al. | |
| 2013/0114925 A1 | 5/2013 | Kawai | |
| 2013/0148978 A1 | 6/2013 | Miao et al. | |
| 2014/0147085 A1 | 5/2014 | Lim | |
| 2014/0321817 A1 | 10/2014 | Wang | |
| 2016/0033729 A1 | 2/2016 | Lin | |
| 2016/0062061 A1 | 3/2016 | Park et al. | |

FOREIGN PATENT DOCUMENTS

| | | |
|---|---|---|
| JP | 2013-137462 A | 7/2013 |
| KR | 10-2014-0056356 A | 5/2014 |
| KR | 10-2014-0066636 A | 6/2014 |
| KR | 10-2014-0090006 A | 7/2014 |
| KR | 10-2016-0027597 A | 3/2016 |

* cited by examiner

MULTI-CHANNEL OPTICAL SUBASSEMBLY AND METHOD OF MANUFACTURING THE SAME

CROSS-REFERENCE TO RELATED APPLICATIONS

This application claims priority under 35 U.S.C. § 119 to Korean Patent Application No. 10-2016-0119484, filed on Sep. 19, 2016, the disclosure of which is incorporated herein by reference in its entirety.

TECHNICAL FIELD

The present invention relates to a multi-channel optical subassembly and a method of manufacturing the same.

BACKGROUND

The demand for multi-channel optical subassemblies, which use an optical fiber instead of a conventional electrical connection in order to transmit large-scale data having high image quality, is increasing. Particularly, in active optical cables (AOCs) such as high-definition multimedia interfaces (HDMIs), DisplayPort, digital visual interfaces (DVIs), etc., research is being done on four or more-channel optical subassemblies where four or more wavelengths are applied to one optical fiber in order to transmit audio/video (A/V) data.

A photoelectric device is mounted on a printed circuit board (PCB), a lens is fixed by using a precise plastic injection, and an optical fiber array is aligned, thereby implementing the multi-channel optical subassemblies.

The multi-channel optical subassemblies each include a mirror, which changes a path of light generated from the photoelectric device, and a plurality of light alignment devices such as lens. Since the multi-channel optical subassemblies each include the plurality of light alignment devices, the number of alignments increases, and light coupling efficiency between the photoelectric device and the optical fiber array is reduced.

SUMMARY

Accordingly, the present invention provides a multi-channel optical subassembly in which passive alignment is easily performed.

The present invention also provides a method of manufacturing a multi-channel optical subassembly.

In one general aspect, a multi-channel optical subassembly includes: a first sub-mount including first and second areas having different thicknesses, a first guide hole being provided in one of the first and second areas; a photoelectric device provided in the first area; a circuit board provided in the second area; a second sub-mount inserted into and fastened to the first guide hole and coupled to the first sub-mount; an optical fiber array fixed to the second sub-mount to provide a path through which light emitted from the photoelectric device is received or transferred; and a micro-lens array mounted on the second sub-mount, the micro-lens array including a lens collecting the light between the photoelectric device and the optical fiber array.

In an embodiment of the present invention, the first sub-mount may further include a stepped portion provided between the first area and the second area.

In an embodiment of the present invention, the first guide hole may be provided in the first area.

In an embodiment of the present invention, the multi-channel optical subassembly may further include a guide pin inserted into and fastened to the first guide hole.

In an embodiment of the present invention, the second sub-mount may include: a recessed portion, the optical fiber array being provided in the recessed portion; a protrusion extending from each of both sides of the recessed portion to surround the recessed portion; and a floor supporting the recessed portion and the protrusion.

In an embodiment of the present invention, the protrusion may include a second guide hole through which the guide pin passes.

In an embodiment of the present invention, the micro-lens array may include: a first surface disposed in the recessed portion, the lens being provided on the first surface; a second surface facing the first surface; and a third surface extending from each of the first surface and the second surface and connecting the first surface to the second surface.

In an embodiment of the present invention, when the micro-lens array is mounted on the second sub-mount, the micro-lens array may have an H-shape.

In an embodiment of the present invention, the photoelectric device may include a light receiving device and/or a light emitting device.

In an embodiment of the present invention, the multi-channel optical subassembly may further include an integrated circuit chip mounted on the circuit board.

In another general aspect, a method of manufacturing a multi-channel optical subassembly includes: forming a first sub-mount including first and second areas having different thicknesses, a first guide hole being provided in one of the first and second areas; bonding a photoelectric device to the first area with epoxy; fixing a circuit board, on which an integrated circuit chip is mounted, to the second area; performing wire bonding on the photoelectric device, the integrated circuit chip, and the circuit board; forming a second sub-mount including a second guide hole corresponding to the first guide hole; forming a guide pin fastened to the second sub-mount through the second guide hole; inserting the guide pin, through which the second guide hole passes, into the first guide hole to couple the second sub-mount to the first sub-mount; mounting a micro-lens array, including a lens collecting light emitted from the photoelectric device, on the second sub-mount; and mounting an optical fiber array, providing a path through which the light is received or transferred, on the second sub-mount with epoxy to be aligned in correspondence with the lens and the photoelectric device.

Other features and aspects will be apparent from the following detailed description, the drawings, and the claims.

DETAILED DESCRIPTION OF EMBODIMENTS

Figure 1:
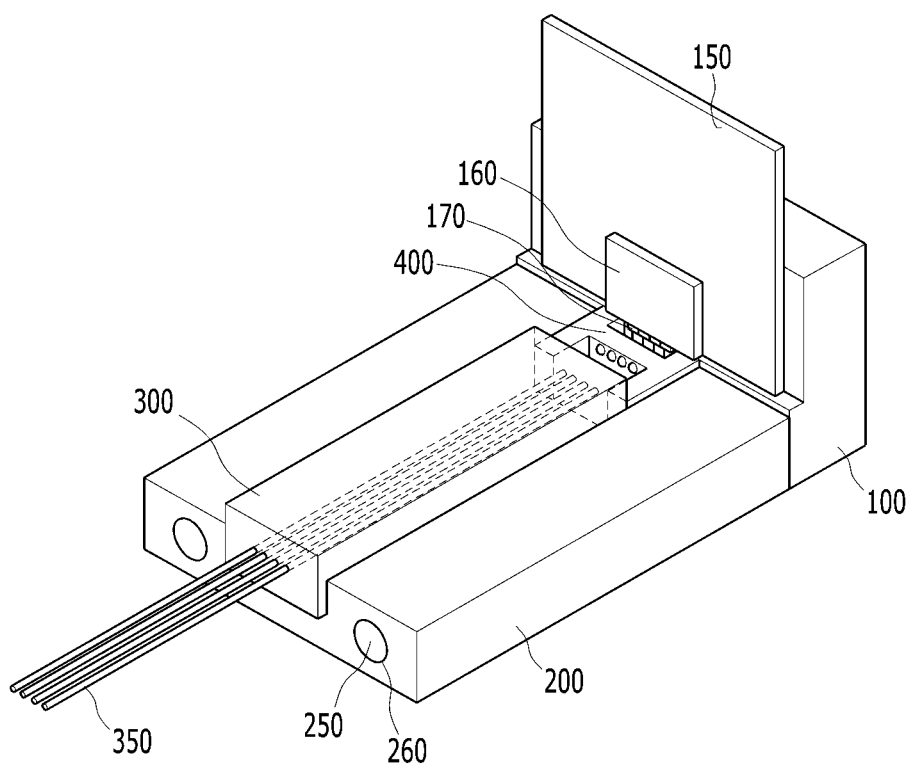
FIG. 1 is a perspective view of a multi-channel optical subassembly according to an embodiment of the present invention.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In describing the drawings, like reference numerals refer to like elements throughout. It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present invention, and similarly, the second element may also be referred to as the first element. In the following description, the technical terms are used only for explain a specific exemplary embodiment while not limiting the present invention. The terms of a singular form may include plural forms unless referred to the contrary.

The meaning of 'comprise', 'include', or 'have' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. In the specification, it will be understood that when a layer (or film), a region, or a plate is referred to as being 'under' another layer, region, or plate, it can be directly under the other layer, region, or plate, or intervening layers, regions, or plates may also be present.

Hereinafter, embodiments of the present invention will be described in more detail with reference to the accompanying drawings.

In the active alignment of the related art, a laser is driven by applying a current to the laser, and then, alignment is performed by monitoring a power of light emitted from the laser. In this case, a manufacturing process is complicated, and the cost is much expended.

In embodiments of the present invention, alignment (positioning) is performed by using a vision, a marker, and/or the like without monitoring light power.

FIG. 1 is a perspective view of a multi-channel optical subassembly according to an embodiment of the present invention.

Referring to FIG. 1, the multi-channel optical subassembly according to an embodiment of the present invention may include a first sub-mount 100, a circuit board 150 with an integrated circuit (IC) chip 160 mounted thereon, a photoelectric device 170, a second sub-mount 200, an optical fiber array 300, and a micro-lens array 400.

The circuit board 150 and the photoelectric device 170 may be mounted on the first sub-mount 100. The first sub-mount 100 may include a wiring connected to a wiring of the IC chip 160 mounted on the circuit board 150 and may connect the IC chip 160 and the photoelectric device 170 so as to enable data communication therebetween through the wiring.

The first sub-mount 100 may use a material for dissipating heat which occurs in the photoelectric device 170 and the IC chip 160. Also, the first sub-mount 100 may use a material which is small in thermal expansion coefficient. In detail, the first sub-mount 100 may include a metal material. Examples of the metal material may include stainless (SUS304, SUS3030, and SUS430), Kovar (Ni—Fe—Co alloy), and CuW alloy which are good in thermal conductivity.

The IC chip 160 may include an amplifier, a modulator, a photoelectric device driving circuit, and/or the like. The IC chip 160 may be disposed on the circuit board 150. The circuit board 150 may include a PCB. The PCB may include a flexible PCB and/or a planar PCB.

The photoelectric device 170 may include a light emitting device and/or a light receiving device. The light emitting device may include a vertical cavity surface emitting layer (VCSEL) or a laser diode (LD). The light receiving device may include a photodiode (PD). The photoelectric device 170 may be provided on the first sub-mount 100 through flip chip bonding, die bonding, or the like.

The second sub-mount 200 may support the optical fiber array 300. The second sub-mount 200 may be coupled to the first sub-mount 100 by a guide pin 250 inserted into a second guide hole 260. The second sub-mount 200 may include a material which is the same as that of the first sub-mount 100.

The optical fiber array 300 may include a plurality of optical fibers 350. The plurality of optical fibers 350 may be disposed in the optical fiber array 300 so as to be aligned in parallel with a direction of light output from the photoelectric device 170.

The micro-lens array 400 may be provided between the photoelectric device 170 and the optical fiber array 300. The micro-lens array 400 may collect the light output from the photoelectric device 170 and may guide the collected light to the plurality of optical fibers 350. Also, the micro-lens array 400 may collect light output from the optical fiber array 300 and may guide the collected light to a light receiving area of the light receiving device.

Figure 2A:
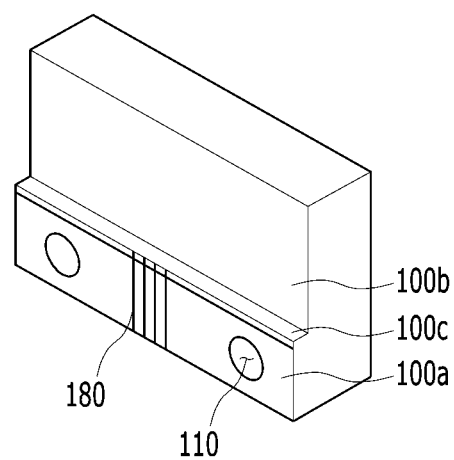
FIG. 2A is a perspective view of a first sub-mount of FIG. 1.
Figure 2B:
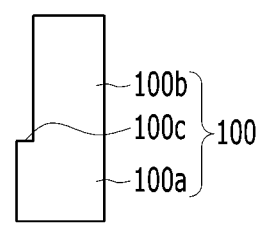
FIG. 2B is a cross-sectional view illustrating a side surface of the first sub-mount of FIG. 2A.
Figure 3:
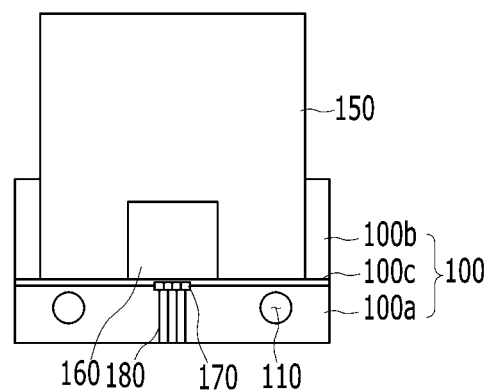
FIG. 3 is a plan view illustrating an example where a circuit board and a photoelectric device are mounted on the first sub-mount of FIG. 2A.

FIG. 2A is a perspective view of the first sub-mount of FIG. 1. FIG. 2B is a cross-sectional view illustrating a side surface of the first sub-mount of FIG. 2A. FIG. 3 is a plan view illustrating an example where the circuit board and the photoelectric device are mounted on the first sub-mount of FIG. 2A.

Referring to FIGS. 1, 2A, 2B, and 3, the first sub-mount 100 may include a first area 100*a*, a second area 100*b*, and a stepped portion 100*c* disposed between the first area 100*a* and the second area 100*b*.

An alignment mark 180 for mounting the photoelectric device 170 may be provided in the first area 100*a* so that a light emitting area and/or a light receiving area of the photoelectric device 170 for passively aligning the micro-lens array 400 and the photoelectric device 170 matches a light collecting area 410 of the micro-lens array 400.

The first area 100*a* and the second area 100*b* may have different thicknesses due to the stepped portion 100*c*. In detail, the thickness of the first area 100*a* may be thicker than that of the second area 100*b*.

The photoelectric device 170 may be disposed on the alignment mark 180 of the first area 100*a*, and the circuit board 150 with the IC chip 160 mounted thereon may be disposed in the second area 100*b*. Here, the photoelectric device 170 and the IC chip 160 may have different thicknesses. When the photoelectric device 170 and the IC chip 160 having the different thicknesses are disposed on the same plane as the first sub-mount 100 and wire bonding is performed for an electrical connection between the photoelectric device 170 and the IC chip 160, a length of a wire can increase due to a thickness difference. When a transmission speed is low, the length of the wire does not affect a signal characteristic, but in high-speed transmission, since the length of the wire affects the signal characteristic, the length of the wire may be minimized.

Therefore, in an embodiment of the present invention, the photoelectric device 170 may be disposed in the first area 100*a* which is thick in thickness, and the IC chip 160 may be disposed in the second area 100*b* which is thinner in thickness than the first area 100*a*, thereby minimizing a thickness difference between the photoelectric device 170 and the IC chip 160. Since the thickness difference between the photoelectric device 170 and the IC chip 160 is minimized, a length of a wire which connects the photoelectric device 170 and the IC chip 160 is reduced.

Moreover, a first guide hole 110 may be disposed in the first area 100*a*. The first guide hole 110 may be inserted into and fastened to the guide pin 250 passing through the second sub-mount 200 and may couple the second sub-mount 200 to the first sub-mount 100.

Figure 4:
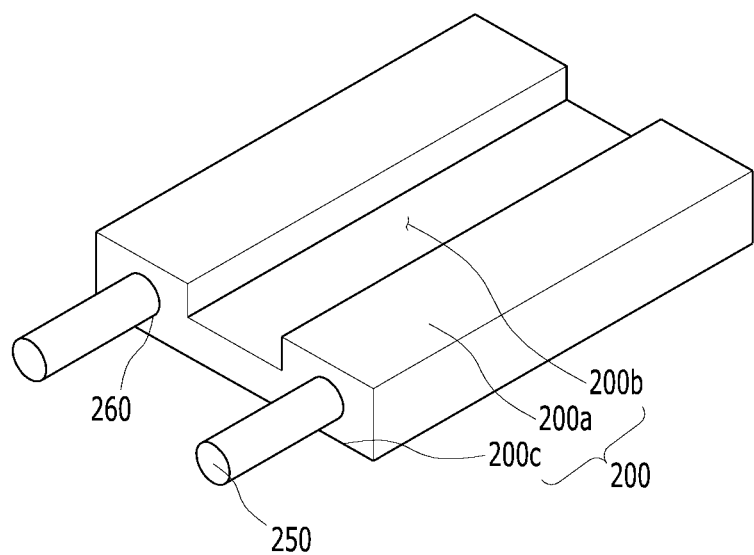
FIG. 4 is a perspective view illustrating a second sub-mount of FIG. 1.

FIG. 4 is a perspective view illustrating the second sub-mount of FIG. 1.

Referring to FIGS. 1 and 4, the second sub-mount 200 may include a protrusion 200*a*, a recessed portion 200*b*, and a floor 200*c*.

The recessed portion 200*b* may have a shape which is recessed in a direction from a top of the protrusion 200*a* to the floor 200*c*, in order for the passive alignment of the optical fiber array 300 to be easily performed.

The protrusion 200*a* may include a second guide hole 260 which extends from both ends of the recessed portion 220*b* and into which the guide pin 250 is inserted.

The guide pin 250 may include one end, which protrudes to the outside of the second guide hole 260 through the second guide hole 260 of the protrusion 200*a* and is inserted into the first guide hole (see 100 of FIG. 2A), and another end facing the one end.

The guide pin 250 may be inserted into the second guide hole 260 and the first guide hole 110, and then, may be hardened by epoxy. The guide pin 250 may be fixed to the first and second guide holes 110 and 260, and thus, the first sub-mount 100 may be coupled to the second sub-mount 200.

As described above, in the multi-channel optical subassembly according to an embodiment of the present invention, since the guide pin 250 is inserted into the first and second guide holes 110 and 260, two the sub-mounts 100 and 200 may be coupled to each other, and thus, the active alignment of the photoelectric device 170, the micro-lens array (see 400 of FIG. 1), and the optical fiber array 300 may be omitted.

According to an embodiment of the present invention, alignment using a vision may be performed.

That is, alignment may be performed in order for the light emitting area and the light receiving area of the photoelectric device to match a center of a micro-lens by using a microscope, and thus, a separate operation of monitoring light power may be omitted, thereby simplifying a manufacturing process and reducing the process cost.

Figure 5:
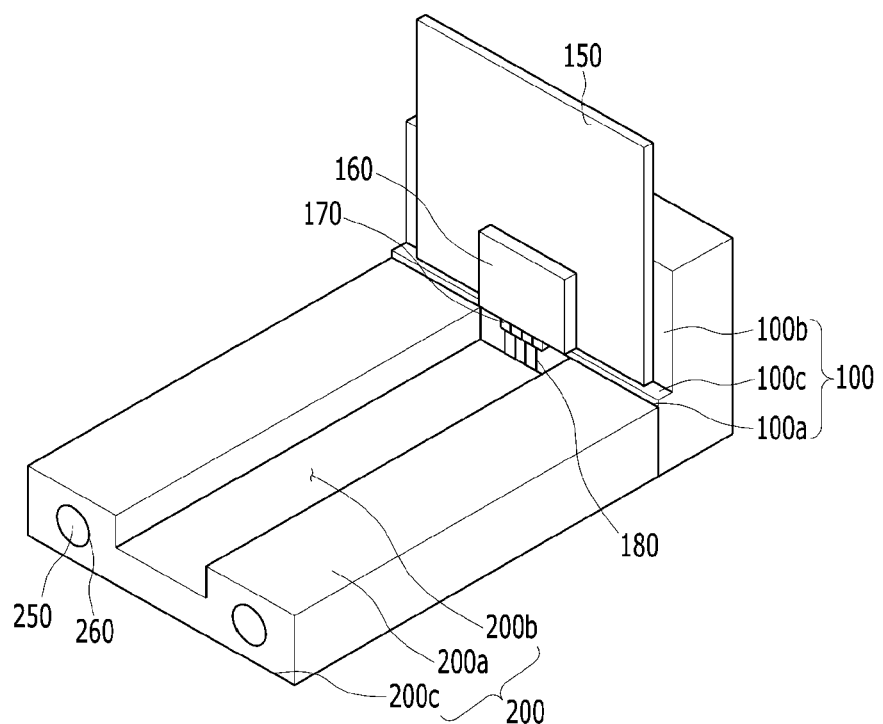
FIG. 5 is a perspective view illustrating an example where the first sub-mount of FIG. 3 is coupled to the second sub-mount of FIG. 4.

FIG. 5 is a perspective view illustrating an example where the first sub-mount of FIG. 3 is coupled to the second sub-mount of FIG. 4.

Referring to FIGS. 3 to 5, the multi-channel optical subassembly according to an embodiment of the present invention may include the first and second sub-mounts 100 and 200 which are coupled to each other by the guide pin 250.

The first sub-mount 100 may include the first and second areas 100*a* and 100*b* which have different thicknesses due to the stepped portion 100*c*. The photoelectric device 170 may be mounted in the first area 100*a*, and the circuit board 150 with the IC chip 160 mounted thereon may be mounted in the second area 100*b*. Here, each of the photoelectric device 170 and the IC chip 160 may be configured as an array type. The photoelectric device 170 having the array type may be mounted in the first area 100*a* of the first sub-mount 100 by using epoxy. The IC chip 160 having the array type may be mounted on the circuit board 150 by using epoxy.

As described above, in the multi-channel optical subassembly according to an embodiment of the present invention, the first sub-mount 100 may be coupled to the second sub-mount 200 by using the guide pin 250, and thus, the first and second sub-mounts 100 and 200 are passively and accurately aligned. Accordingly, in the multi-channel optical subassembly according to an embodiment of the present invention, since the elements configuring the multi-channel optical subassembly are inserted, coupled, and fixed, positions of the elements are aligned, and thus, the multi-channel optical subassembly is implemented even without the positions of the elements being separately aligned.

The guide pin 250 may be inserted into the second guide hole 260 and the first guide hole 110, hardened by epoxy, and fixed. Also, the guide pin 250 may be inserted into and fixed to the second guide hole 260 and the first guide hole 110 through press-fit.

Figure 6A:
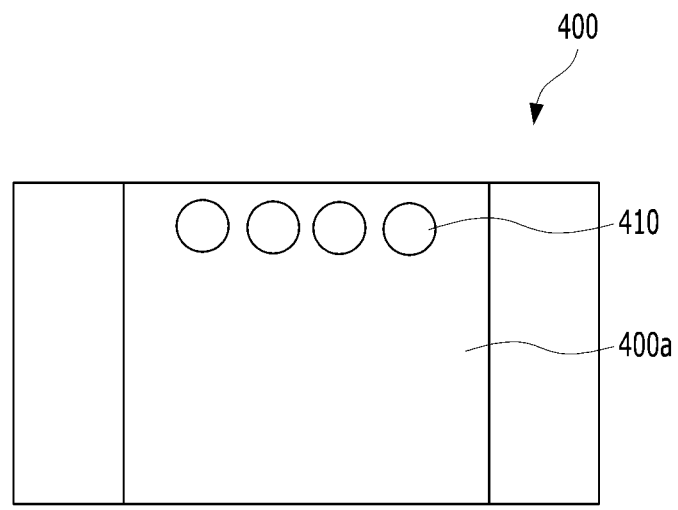
FIG. 6A is a front view illustrating one surface of a micro-lens array of FIG. 1.
Figure 6B:
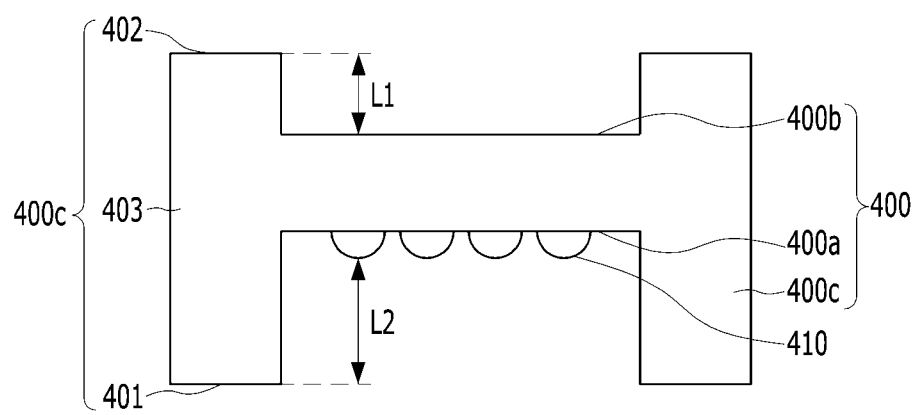
FIG. 6B is a plan view when the micro-lens array of FIG. 1 is seen from above.
Figure 7A:
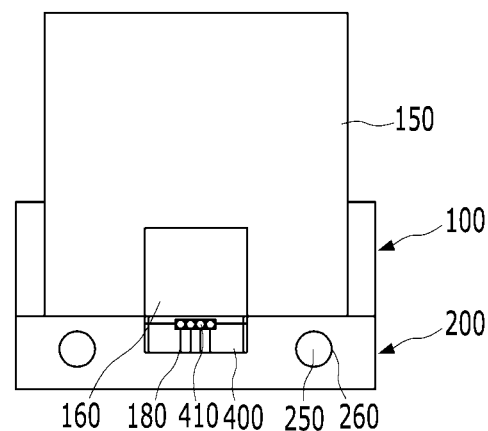
FIG. 7A is a plan view illustrating an example where the micro-lens array of FIG. 6A is mounted on the coupled first and second sub-mounts of FIG. 5.
Figure 7B:
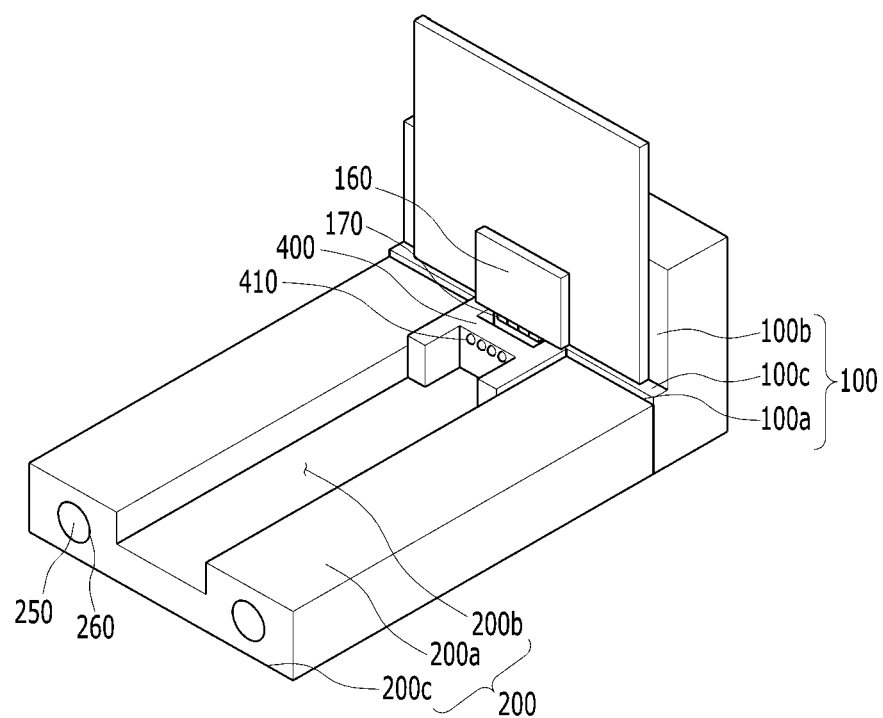
FIG. 7B is a perspective view illustrating an example where the micro-lens array of FIG. 6A is mounted on the coupled first and second sub-mounts of FIG. 5.

FIG. 6A is a front view illustrating one surface of the micro-lens array of FIG. 1. FIG. 6B is a plan view when the micro-lens array of FIG. 1 is seen from above. FIG. 7A is a plan view illustrating an example where the micro-lens array of FIG. 6A is mounted on the coupled first and second sub-mounts of FIG. 5. FIG. 7B is a perspective view illustrating an example where the micro-lens array of FIG. 6A is mounted on the coupled first and second sub-mounts of FIG. 5.

Referring to FIGS. 1, 5, 6A, 6B, 7A, and 7B, the multi-channel optical subassembly according to an embodiment of the present invention may include the first and second sub-mounts 100 and 200 coupled to each other by the guide pin 250 and the micro-lens array 400 mounted on the second sub-mount 200.

The micro-lens array 400 may include a first surface 400*a* including the light collecting area 410 which collects light, a second surface 400*b* facing the first surface 400*a*, and a third surface 400*c* connecting the first surface 400*a* to the second surface 400*b*.

The second surface 400b may face the first surface 400a, and light emitted from the light emitting device of the photoelectric device 170 may be incident on the second surface 400b. The first surface 400a may include the light collecting area 410 which collects light incident from the second surface 400b and provides the collected light to the optical fiber array (see 300 of FIG. 1). Also, light output from the optical fiber array 300 may be incident on the first surface 400a and may be collected in the light collecting area 410, and the collected light may be incident on the light receiving area of the light receiving device included in the photoelectric device 170. Here, the micro-lens array 400 may be a focusing lens and may be provided as an array type including a plurality of light collecting areas 410. The third surface 400c may include a first side 401 extending from the first surface 400a, a second side 402 extending from the second surface 400b, and a third side 403 which extends from each of the first side 401 and the second side 402 and connects the first side 401 to the second side 402.

When the micro-lens array 400 is provided in the recessed portion 200b of the second sub-mount 200, as illustrated in FIG. 6B, the micro-lens array 400 may have an H-shape.

In detail, the micro-lens array 400 may be provided in the recessed portion 200b to face the optical fiber array (see 300 of FIG. 1), where the first surface 400a is mounted on the recessed portion 200b, and the photoelectric device 170 where the second surface 400b is mounted on the first sub-mount 100. In this case, the optical fiber array 300 may contact the first side 401 included in the third surface 400c of the micro-lens array 400, and the first sub-mount 100 with the photoelectric device 170 mounted thereon may contact the second side 402 included in the third surface 400c of the micro-lens array 400.

Therefore, a shape of the micro-lens array 400 may be modified in consideration of a distance (hereinafter referred to as a first distance) L1 between the photoelectric device 170 and the second surface 400b and a distance (hereinafter referred to as a second distance) L2 between the optical fiber array 300 and the first surface 400a including the light collecting area 410. Here, the first distance L1 may be about 0.15 mm, and the second distance L2 may be about 0.60 mm. However, the present embodiment is not limited thereto. Since the first distance L1 and the second distance L2 are determined based on the shape of the micro-lens array 400, the micro-lens array 400 may be provided in the recessed portion 200b of the second sub-mount 200, and thus, a position of the micro-lens array 400 may be fixed. Since the micro-lens array 400 is implemented in an H-shape, an active alignment process of determining a focal distance of a lens for collecting light may be omitted. Also, the optical fiber array 300 may be provided in the recessed portion 200b of the second sub-mount 200 to face the light collecting area 410 of the micro-lens array 400, and a position of the optical fiber array 300 may be fixed. Due to such a configuration, positions of the micro-lens array 400 and the optical fiber array 300 are precisely aligned.

As described above, in the multi-channel optical subassembly according to an embodiment of the present invention, since all elements are inserted, coupled, and fixed, the elements may be coupled to each other, and thus, positions of the elements may be aligned. Accordingly, in the multi-channel optical subassembly according to an embodiment of the present invention, the elements are precisely aligned even without the positions being separately aligned.

Figure 8:
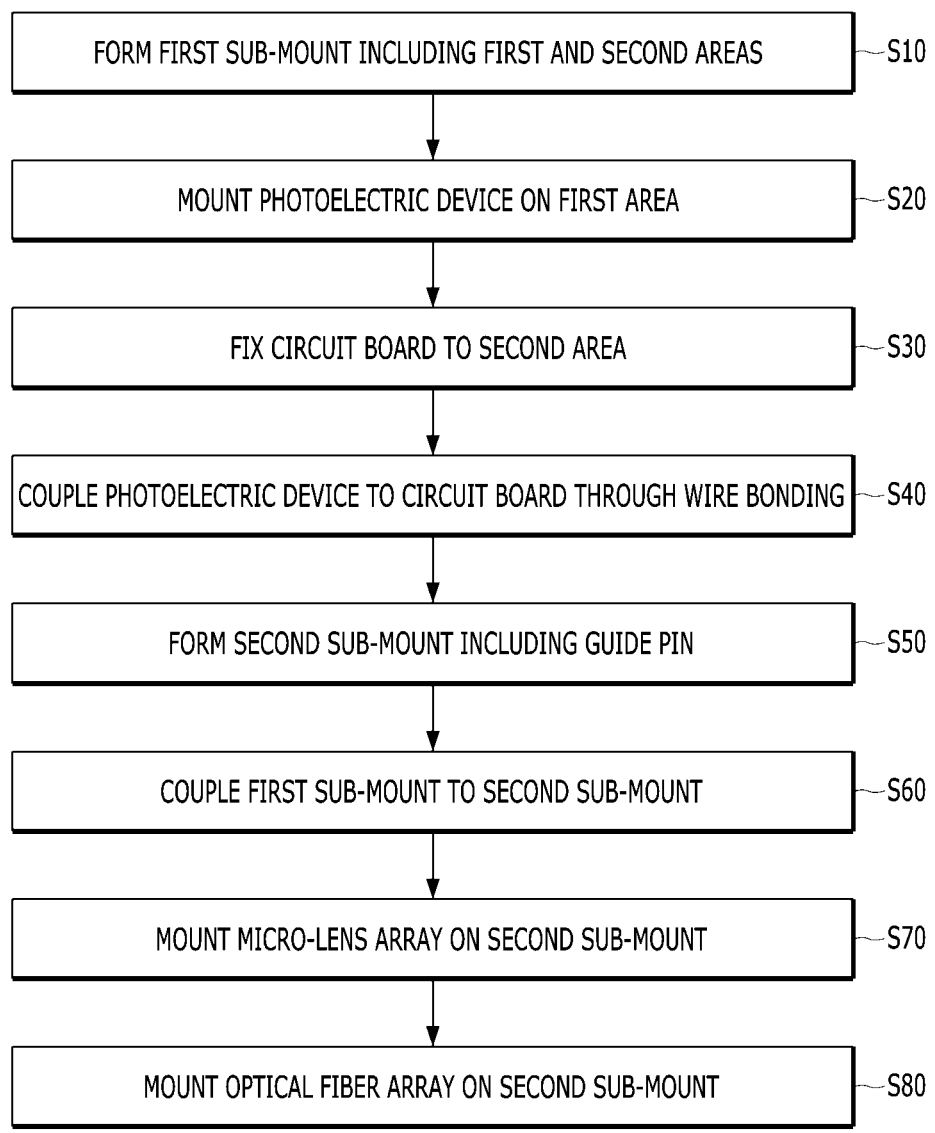
FIG. 8 is a flowchart for describing a method of manufacturing a multi-channel optical subassembly according to an embodiment of the present invention.

FIG. 8 is a flowchart for describing a method of manufacturing a multi-channel optical subassembly according to an embodiment of the present invention.

Referring to FIGS. 1, 7A, 7B, and 8, in step S10, the first sub-mount 100 including the first area 100a and the second area 100b may be provided. The first area 100a and the second area 100b may have different thicknesses due to the stepped portion 100c. Here, a thickness of the first area 100a may be thicker than that of the second area 100b. The first guide hole 110 may be provided in the first area 100a.

Subsequently, in step S20, the photoelectric device 170 may be provided in the first area 100a by using epoxy.

Subsequently, in step S30, the circuit board 150 with the IC chip 160 mounted thereon may be fixed in the second area 100b.

Subsequently, in step S40, the photoelectric device 170 may be coupled to the circuit board 150 through wire bonding. In this case, the photoelectric device 170 may be provided in the first area 100a, and the circuit board 150 may be provided in the second area 100b, whereby a length of a wire which connects the photoelectric device 170 and the circuit board 150 is minimized.

Subsequently, in step S50, the second sub-mount 200 including the guide pin 250 may be provided. The second sub-mount 200 may include the protrusion 200a, the recessed portion 200b, and the floor 200c. The guide pin 250 may be inserted into the second guide hole 260 of the protrusion 200a and may be coupled to the second sub-mount 200.

Subsequently, in step S60, the first sub-mount 100 may be coupled to the second sub-mount 200. One side of the guide pin 250 coupled to the second sub-mount 200 may be inserted into the first guide hole 110 of the first sub-mount 100, and thus, the first sub-mount 100 may be coupled to the second sub-mount 200.

Subsequently, in step S70, the micro-lens array 400 may be provided in the recessed portion 200b of the second sub-mount 200. Here, the micro-lens array 400 may have an H-shape.

Finally, in step S80, the optical fiber array 300 including the optical fiber 350 may be provided in the recessed portion 200b of the second sub-mount 200. Here, a position of the optical fiber 350 may be fixed to correspond to the light collecting area 410 of the micro-lens array 400.

As described above, according to the embodiments of the present invention, a multi-channel optical subassembly which has a passive alignment structure and is simple in alignment and coupling structure of elements configuring the multi-channel optical subassembly is provided.

Moreover, according to the embodiments of the present invention, a method for easily manufacturing the multi-channel optical subassembly is provided.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A multi-channel optical subassembly comprising:
a first sub-mount including first and second areas having different thicknesses, a first guide hole being provided in one of the first and second areas;
a photoelectric device provided in the first area;
a circuit board provided in the second area;

a second sub-mount inserted into and fastened to the first guide hole and coupled to the first sub-mount;

an optical fiber array fixed to the second sub-mount to provide a path through which light emitted from the photoelectric device is received or transferred; and a micro-lens array mounted on the second sub-mount, the micro-lens array including a lens collecting the light between the photoelectric device and the optical fiber array, and the micro-lens array being aligned based on an image according to an H-shape thereof.

2. The multi-channel optical subassembly of claim 1, wherein the first sub-mount further comprises a stepped portion provided between the first area and the second area.

3. The multi-channel optical subassembly of claim 2, wherein the first guide hole is provided in the first area.

4. The multi-channel optical subassembly of claim 3, further comprising a guide pin inserted into and fastened to the first guide hole.

5. The multi-channel optical subassembly of claim 4, wherein the second sub-mount comprises:

a recessed portion, the optical fiber array being provided in the recessed portion;

a protrusion extending from each of both sides of the recessed portion to surround the recessed portion; and a floor supporting the recessed portion and the protrusion.

6. The multi-channel optical subassembly of claim 5, wherein the protrusion comprises a second guide hole through which the guide pin passes.

7. The multi-channel optical subassembly of claim 5, wherein the micro-lens array comprises:

a first surface disposed in the recessed portion, the lens being provided on the first surface;

a second surface facing the first surface; and a third surface extending from each of the first surface and the second surface and connecting the first surface to the second surface.

8. The multi-channel optical subassembly of claim 1, wherein the photoelectric device comprises a light receiving device and/or a light emitting device.

9. The multi-channel optical subassembly of claim 1, further comprising an integrated circuit chip mounted on the circuit board.

10. A method of manufacturing a multi-channel optical subassembly, the method comprising:

forming a first sub-mount including first and second areas having different thicknesses, a first guide hole being provided in one of the first and second areas;

bonding a photoelectric device to the first area with epoxy;

fixing a circuit board, on which an integrated circuit chip is mounted, to the second area;

performing wire bonding on the photoelectric device, the integrated circuit chip, and the circuit board;

forming a second sub-mount including a second guide hole corresponding to the first guide hole;

forming a guide pin fastened to the second sub-mount through the second guide hole;

inserting the guide pin, through which the second guide hole passes, into the first guide hole to couple the second sub-mount to the first sub-mount;

mounting a micro-lens array, including a lens collecting light emitted from the photoelectric device, on the second sub-mount; and mounting an optical fiber array, providing a path through which the light is received or transferred, on the second sub-mount with epoxy to be aligned in correspondence with the lens and the photoelectric device.

* * * * *